(12) United States Patent
Yurgil

(10) Patent No.: US 8,112,193 B2
(45) Date of Patent: Feb. 7, 2012

(54) VIRTUAL TENSIONER TRAVEL SENSOR FOR A SERPENTINE BELT TENSIONER ASSEMBLY

(75) Inventor: James R. Yurgil, Livonia, MI (US)

(73) Assignee: GM Global Technology Operations LLC

( * ) Notice: Subject to any disclaimer, the term of this patent is extended or adjusted under 35 U.S.C. 154(b) by 784 days.

(21) Appl. No.: 12/195,622

(22) Filed: Aug. 21, 2008

(65) Prior Publication Data
US 2009/0195203 A1  Aug. 6, 2009

Related U.S. Application Data

(60) Provisional application No. 61/025,512, filed on Feb. 1, 2008.

(51) Int. Cl.
G06F 7/00 (2006.01)
G06F 19/00 (2011.01)

(52) U.S. Cl. .......................................... 701/29; 701/36

(58) Field of Classification Search .................. 701/29, 701/36
See application file for complete search history.

(56) References Cited

U.S. PATENT DOCUMENTS

| | | | | |
|---|---|---|---|---|
| 5,952,586 | A * | 9/1999 | Matui et al. | 73/862.194 |
| 6,249,726 | B1 * | 6/2001 | Burke, II et al. | 701/29 |
| 6,367,570 | B1 * | 4/2002 | Long, III et al. | 180/65.26 |
| 6,834,228 | B2 * | 12/2004 | Serkh et al. | 701/115 |
| 2008/0021603 | A1 * | 1/2008 | Zettel et al. | 701/29 |

* cited by examiner

Primary Examiner — David Dunn
Assistant Examiner — Philip Gabler (57) ABSTRACT

A control module of a vehicle comprises a drive diagnostic module and a hybrid control module. The drive diagnostic module determines a load energy of an accessory drive system of the vehicle and determines a slip percentage of a belt of the accessory drive system based on an engine speed and a motor speed. The hybrid control module determines a requested motor torque based on at least one of the load energy and the slip percentage. The control module controls a motor of the vehicle based on the requested motor torque.

22 Claims, 8 Drawing Sheets

VIRTUAL TENSIONER TRAVEL SENSOR FOR A SERPENTINE BELT TENSIONER ASSEMBLY

CROSS-REFERENCE TO RELATED APPLICATIONS

This application claims the benefit of U.S. Provisional Application No. 61/025,512, filed on Feb. 1, 2008. The disclosure of the above application is incorporated herein by reference.

FIELD

The present disclosure relates to accessory drive systems, and more specifically to a tensioner travel sensor for accessory drive systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric hybrid vehicles may include an internal combustion engine, an electric drive motor, and a rechargeable battery that powers the motor. The motor may transmit power and may charge the battery through an engagement with an engine crankshaft. The engagement may include an accessory drive system. The accessory drive system may include a serpentine belt engaged with the crankshaft and an input/output of the motor to transfer rotation therebetween.

The accessory drive system may include a tensioner assembly that maintains tension of the belt during operation. The tensioner assembly may travel (i.e., pivot) during operation to maintain tension on the belt. The tensioner assembly allows the crankshaft and the input/output of the motor to provide adequate torque without the belt slipping off either the crankshaft or the motor. Additional components, such as a belt alternator starter, added to the accessory drive system may create operating conditions that result in the accessory drive system operating beyond its maximum and minimum design limits.

SUMMARY

A control module of a vehicle comprises a drive diagnostic module and a hybrid control module. The drive diagnostic module determines a load energy of an accessory drive system of the vehicle and determines a slip percentage of a belt of the accessory drive system based on an engine speed and a motor speed. The hybrid control module determines a requested motor torque based on at least one of the load energy and the slip percentage. The control module controls a motor of the vehicle based on the requested motor torque.

A method of operating a control module of a vehicle comprises determining a load energy of an accessory drive system of the vehicle, determining a slip percentage of a belt of the accessory drive system based on an engine speed and a motor speed, determining a requested motor torque based on at least one of the load energy and the slip percentage, and controlling a motor of the vehicle based on the requested motor torque.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
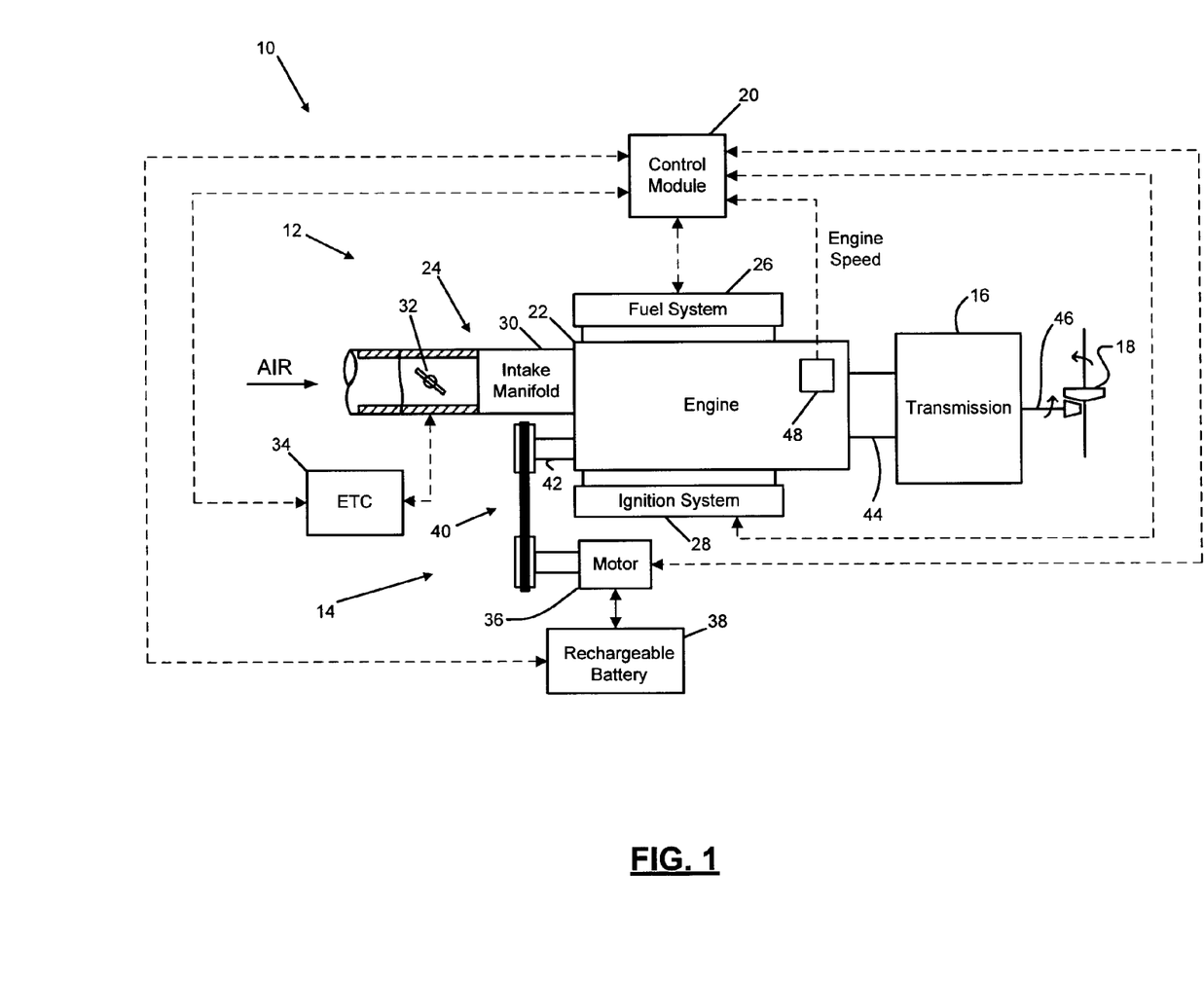
FIG. 1 is a functional block diagram of an exemplary electric hybrid vehicle according to the principles of the present disclosure.

Referring now to FIG. 1, an exemplary electric hybrid the vehicle 10 is shown. The vehicle 10 includes an engine assembly 12, a hybrid power assembly 14, a transmission 16, a drive axle 18, and a control module 20. The engine assembly 12 includes an internal combustion engine 22 in communication with an intake system 24, a fuel system 26, and an ignition system 28.

The intake system 24 includes an intake manifold 30, a throttle 32, and an electronic throttle control (ETC) 34. The ETC 34 controls the throttle 32 to control an airflow into the engine 22. The fuel system 26 includes fuel injectors (not shown) to control a fuel flow into the engine 22. The ignition system 28 ignites an air/fuel mixture provided to the engine 22 by the intake system 24 and the fuel system 26.

The hybrid power assembly 14 includes an electric drive motor 36 and a rechargeable battery 38. The motor 36 is in electrical communication with the battery 38 to convert power from the battery 38 to mechanical power. The motor 36 is additionally operated as a generator to provide power to charge the battery 38. The engine 22 and the motor 36 are coupled via an accessory drive system 40.

The engine assembly 12 drives the transmission 16. The engine 22 includes a crankshaft 42 coupled to the transmission 16 via a coupling device 44. The coupling device 44 may include a friction clutch or a torque converter. The transmission 16 uses the power provided from the engine 22 and/or the motor 36 to drive an output shaft 46 and to power rotation of the drive axle 18. Alternatively, rotation of the drive axle 18 is used to power rotation of the crankshaft 42 and to drive the motor 36 for recharging of the battery 38.

The control module 20 is in communication with the fuel system 26, the ignition system 28, the ETC 34, the motor 36, and the battery 38. The vehicle 10 measures a speed of the crankshaft 42 (i.e., an engine speed) using an engine speed sensor 48. The engine speed sensor 48 may be located within the engine 22 or at other locations, such as on the crankshaft 42 (not shown), for example. The control module 20 receives the engine speed. The control module 20 controls operation of the engine 22 and the motor 36 and selectively controls recharging of the battery 38.

Figure 2:
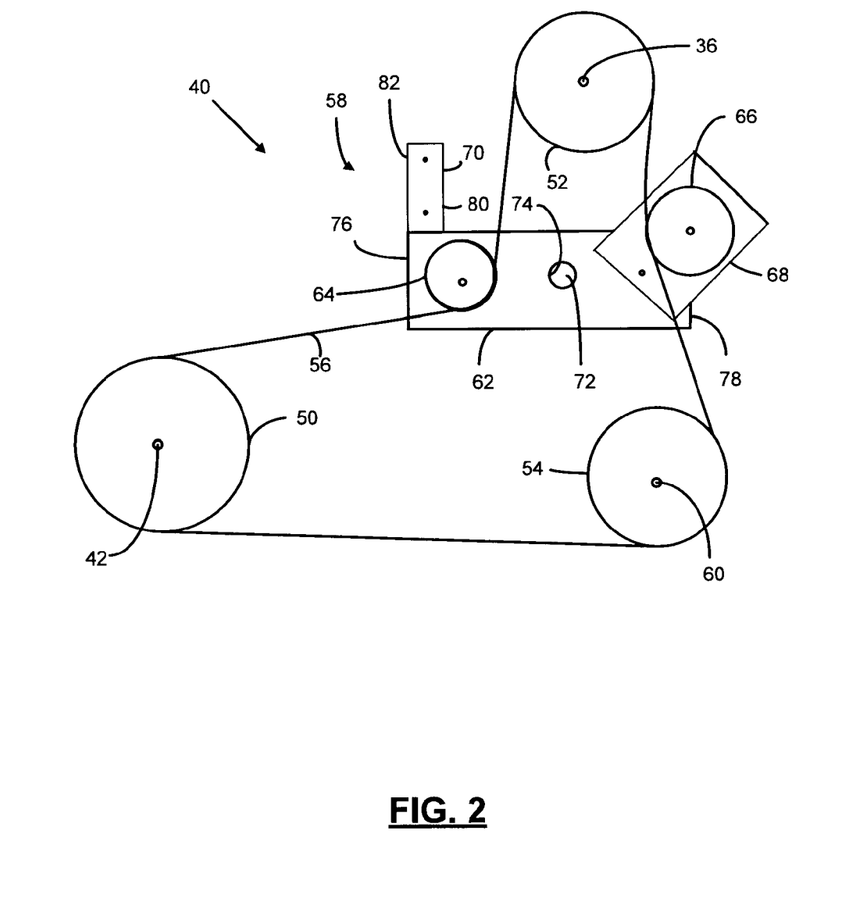
FIG. 2 is a functional block diagram of an exemplary accessory drive system of the vehicle according to the principles of the present disclosure.

With reference to FIG. 2, the accessory drive system 40 is presented and includes first, second, and third hubs 50, 52, 54, a serpentine belt 56, and a tensioner assembly 58. The first hub 50 is fixed to the crankshaft 42 for rotation therewith. The second hub 52 is fixed to an output of the motor 36. The third hub 54 is fixed to an additional component 60 driven by the crankshaft 42 and/or the motor 36, such as a belt alternator starter. The belt 56 is engaged with the first, the second and the third hubs 50, 52, 54 to transfer rotation therebetween.

The tensioner assembly 58 includes a bracket 62, first and second belt tensioner hubs 64, 66, a friction damped rotary tensioner 68, a hydraulic strut tensioner 70, and a pivot coupling 72. The bracket 62 includes an aperture 74 located between first and second ends 76, 78 thereof. The first and the second belt tensioner hubs 64, 66 is rotatably coupled to the first and the second ends 76, 78, respectively. More specifically, the second belt tensioner hub 66 is coupled to the friction damped rotary tensioner 68 which is coupled to the second end 78. The hydraulic strut tensioner 70 includes a first end 80 coupled to the first end 76 of the bracket 62 and a second end 82 coupled to the engine 22.

Figure 3:
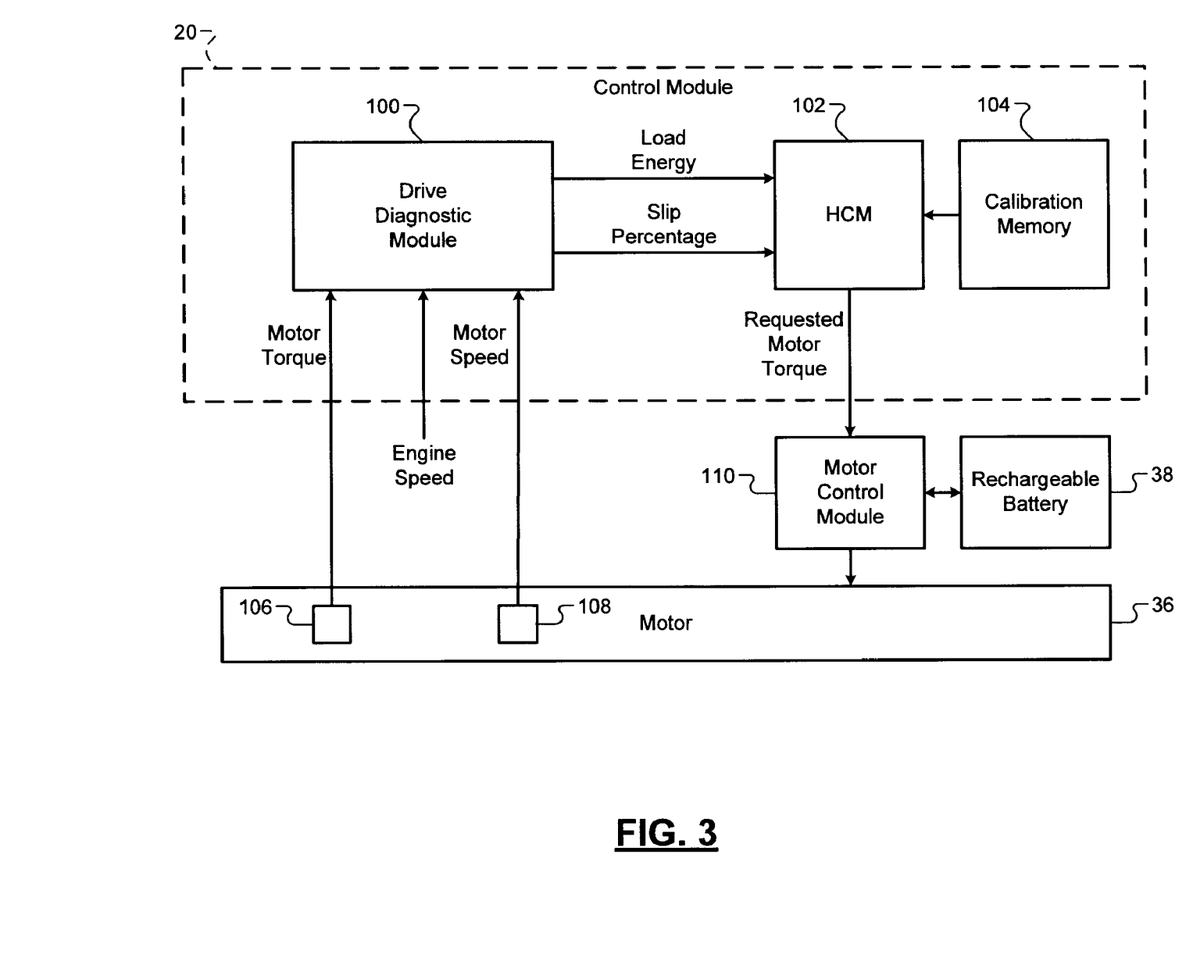
FIG. 3 is a functional block diagram of an exemplary control module of the vehicle according to the principles of the present disclosure.

Referring now to FIG. 3, the control module 20 is shown and includes a drive diagnostic module 100, a hybrid control module (HCM) 102, and a calibration memory 104. A torque of the output of the motor 36 (i.e., a motor torque) is measured using a motor torque sensor 106. A speed of the output of the motor 36 (i.e., a motor speed) is measured using a motor speed sensor 108. The motor torque and the motor speed sensors 106, 108 may be located within the motor 36 or at other locations, such as on the output of the motor 36 (not shown), for example.

The drive diagnostic module 100 receives the motor torque, the engine speed, and the motor speed. The drive diagnostic module 100 determines a cumulative, transient energy used to drive loads on the accessory drive system 40 (i.e., a load energy) based on the motor torque, the engine speed, and the motor speed. The load energy is initially set to zero. The drive diagnostic module 100 further determines a percentage of a slip of the belt 56 (i.e., a slip percentage) based on the engine and the motor speeds.

The HCM 102 receives the load energy and the slip percentage. The HCM 102 determines a requested motor torque for the motor 36. The HCM 102 applies limits to the requested motor torque based on at least one of the load energy and the slip percentage. The HCM 102 may apply limits to the requested motor torque further based on geometries of components of the accessory drive system 40 (e.g., a ratio of sizes of the first and the second hubs 50, 52).

The HCM 102 applies a torque upper limit to the requested motor torque when the load energy reaches a energy upper limit that is detrimental for the durability of the accessory drive system 40. Applying the torque upper limit protects against requested motor torques that would damage the accessory drive system 40. The torque upper limit and the energy upper limit may be determined from the calibration memory 104. Alternatively, the torque upper limit and the energy upper limit may be determined based on the geometries of the components of the accessory drive system 40.

The HCM 102 applies a torque lower limit to the requested motor torque when the load energy reaches a energy lower limit that is detrimental for the durability of the accessory drive system 40. Applying the torque lower limit protects against requested motor torques that would stall the accessory drive system 40. The torque lower limit and the energy lower limit may be determined from the calibration memory 104. Alternatively, the torque lower limit and the energy lower limit may be determined based on the geometries of the components of the accessory drive system 40.

Even if the load energy does not reach the energy upper limit, the HCM 102 applies the torque upper limit to the requested motor torque when the slip percentage reaches a slip percentage upper limit. The slip percentage upper limit is detrimental for the durability of the accessory drive system 40. The slip percentage upper limit is determined from the calibration memory 104.

Even if the load energy does not reach the energy lower limit, the HCM 102 applies the torque lower limit to the requested motor torque when the slip percentage reaches a slip percentage lower limit. The slip percentage reaching the slip percentage lower limit is detrimental for the durability of the accessory drive system 40. The slip percentage lower limit is determined from the calibration memory 104.

The HCM 102 outputs the requested motor torque, as limited, to a motor control module 110 that controls the motor 36 based on the requested motor torque. The motor control module 110 commands the battery 38 to supply a D/C current, for example, to the motor control module 110 in an amount that allows the motor 36 to produce the requested motor torque. The motor control module 110 converts the D/C current to an A/C current and directs the A/C current to the motor 36 to produce the requested motor torque. The motor control module 110 may be located near the motor 36 or at other locations, such as within the control module 20 (not shown), for example.

Figure 4:
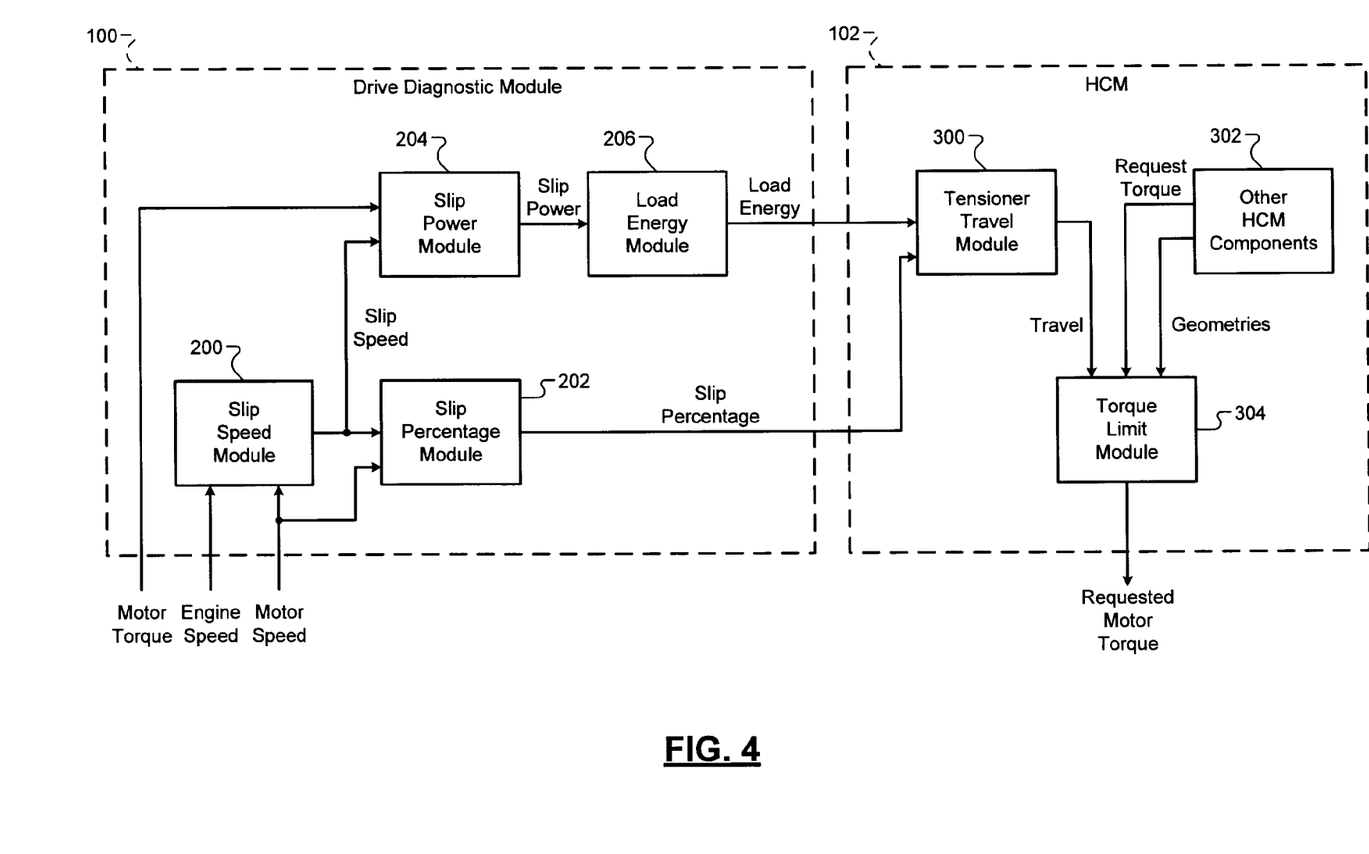
FIG. 4 is a functional block diagram of an exemplary drive diagnostic module and an exemplary hybrid control module of the control module according to the principles of the present disclosure.

Referring now to FIG. 4, the drive diagnostic module 100 and the HCM 102 is presented. The drive diagnostic module 100 includes a slip speed module 200, a slip percentage module 202, a slip power module 204, and a load energy module 206. The HCM 102 includes a tensioner travel module 300, other HCM components, identified collectively at 302, and a torque limit module 304.

The slip speed module 200 receives the engine and the motor speeds. The slip speed module 200 determines a speed of the slip of the belt 56 (i.e., a slip speed) based on the engine and the motor speeds. The slip speed is initially set to zero.

The slip speed $v_s$ may be determined according to the following equation:

$$v_s(t) = v_s(t-dt) + k_s(v_m(t) - k_{eng}v_{eng}(t) - v_s(t-dt)), \quad (1)$$

where t−dt is a time value associated with a previously determined slip speed, $k_s$ is a predetermined constant (i.e., a smoothing factor) between 0 and 1 in value, $v_m$ is the motor speed, $k_{eng}$ is a predetermined engine speed constant, and $v_{eng}$ is the engine speed. The slip percentage module 202 receives the slip and the motor speeds and determines the slip percentage based on the slip and the motor speeds. The slip percentage PER may be determined according to the following equation:

$$PER = 100 \times (v_s/v_m). \quad (2)$$

The slip power module 204 receives the motor torque and the slip speed. The slip power module 204 determines an instant power of the slip of the belt 56 (i.e., a slip power) based on the motor torque and the slip speed. The slip power P may be determined according to the following equation:

$$P = 2\pi/60 \times T_{mot}v_s, \quad (3)$$

where $T_{mot}$ is the motor torque. The load energy module 206 receives the slip power and determines the load energy based on the slip power. The load energy E may be determined according to the following equation:

$$E = E + P\Delta t, \quad (4)$$

where $\Delta t$ is a change in time between determining the load energy.

The tensioner travel module 300 receives the load energy and the slip percentage. The tensioner travel module 300 determines a tensioner travel signal based on at least one of the load energy and the slip percentage. The tensioner travel signal indicates whether the accessory drive system 40 is operating at or beyond its design limits. The tensioner travel signal is used to apply limits to the requested motor torque. The tensioner travel signal is initially set to a predetermined signal, such as a normal signal.

The tensioner travel module 300 sets the tensioner travel signal to an upper limit signal when the load energy is greater than or equal to the energy upper limit. The tensioner travel module 300 sets the tensioner travel signal to a lower limit signal when the load energy is less than or equal to the energy lower limit. Even if the load energy is not greater than or equal to the energy upper limit, the tensioner travel module 300 sets the tensioner travel signal to the upper limit signal when the slip percentage is greater than or equal to the slip percentage upper limit. Even if the load energy is not less than or equal to the energy lower limit, the tensioner travel module 300 sets the tensioner travel signal to the lower limit signal when the slip percentage is less than or equal to the slip percentage lower limit. In all other cases, the tensioner travel module 300 sets the tensioner travel signal to the predetermined signal.

The other HCM components 302 may include a hybrid optimization module, for example, that determines how much torque should be produced by the engine 22 and how much torque should be produced by the motor 36 (i.e., the requested motor torque). The other HCM components 302 may further determine the geometries of the components of the accessory drive system 40. The geometries may be used to apply limits to the requested motor torque.

The torque limit module 304 receives the tensioner travel signal, the requested motor torque, and the geometries of the components of the accessory drive system 40. The torque limit module 304 applies limits to the requested motor torque based on at least one of the tensioner travel signal and the geometries. The torque limit module 304 applies the torque upper limit to the requested motor torque when the tensioner travel signal is the upper limit signal. The torque limit module 304 applies the torque lower limit to the requested motor torque when the tensioner travel signal is the lower limit signal. The torque limit module 304 outputs the requested motor torque, as limited, to the motor control module 110.

Figure 5:
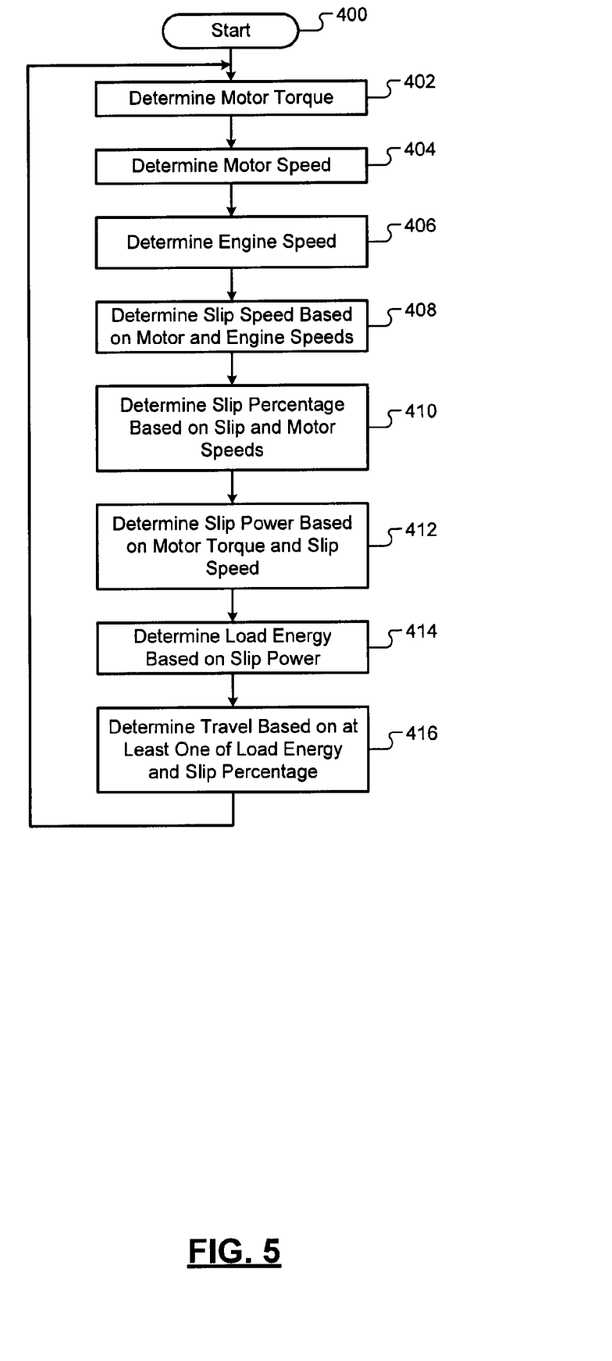
FIG. 5 is a flowchart depicting exemplary steps performed by the control module according to the principles of the present disclosure.

Referring now to FIG. 5, a flowchart depicts exemplary steps performed by the control module 20. Control begins in step 400. In step 402, the motor torque is determined.

In step 404, the motor speed is determined. In step 406, the engine speed is determined. In step 408, the slip speed is determined based on the motor and the engine speeds.

In step 410, the slip percentage is determined based on the slip and the motor speeds. In step 412, the slip power is determined based on the motor torque and the slip speed. In step 414, the load energy is determined based on the slip power. In step 416, the tensioner travel signal (i.e., Travel) is determined based on at least one of the load energy and the slip percentage. Control returns to step 402.

Figure 6:
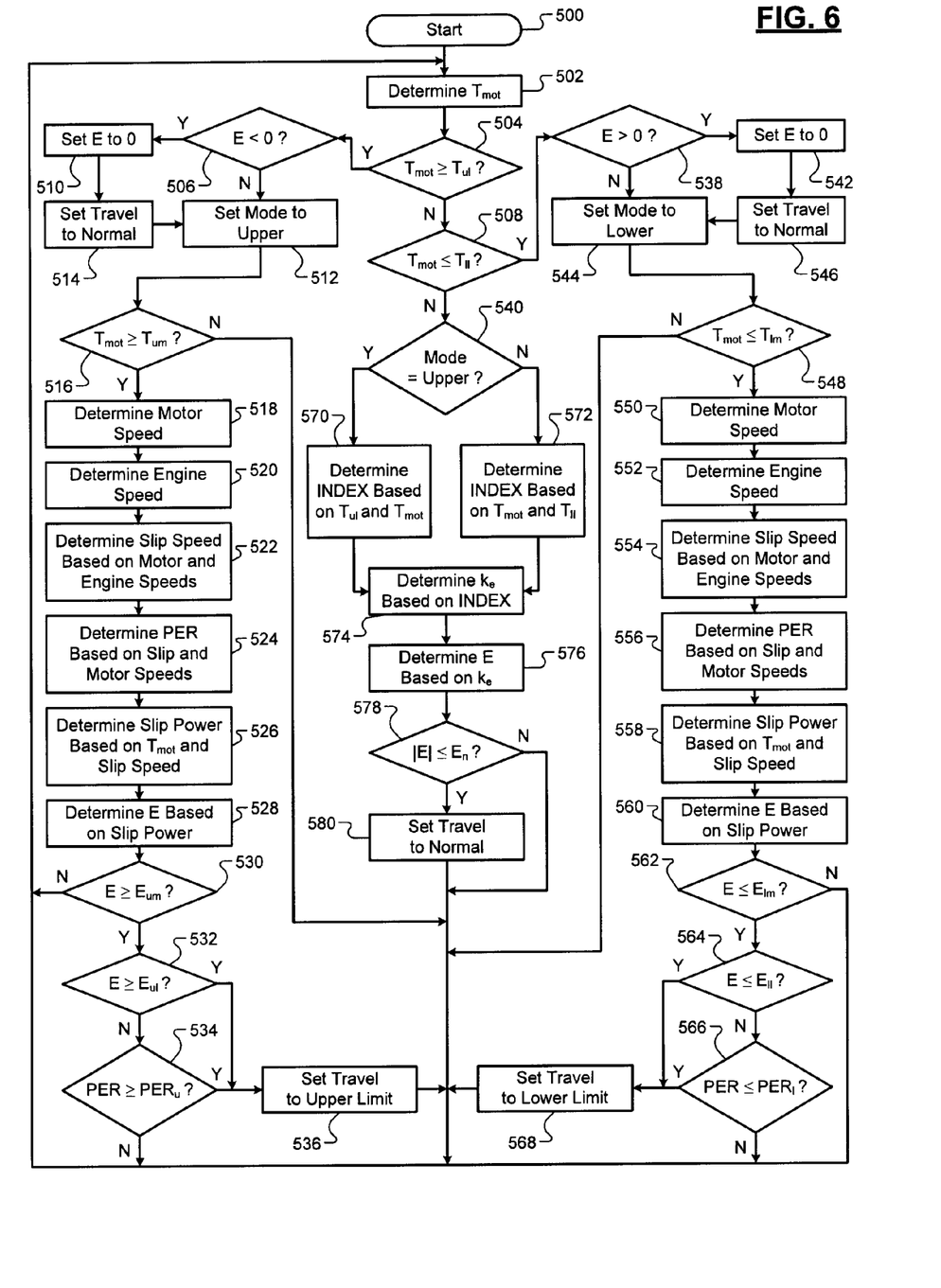
FIG. 6 is a flowchart depicting alternative exemplary steps performed by the control module according to the principles of the present disclosure.

Referring now to FIG. 6, a flowchart depicts alternative exemplary steps performed by the control module 20. Control begins in step 500. In step 502, the motor torque (i.e., $T_{mot}$) is determined.

In step 504, control determines whether the motor torque is greater than or equal to the torque upper limit (i.e., $T_{ul}$). If true, control continues in step 506. If false, control continues in step 508. In step 506, control determines whether the load energy (i.e., E) is less than zero. If true, control continues in step 510. If false, control continues in step 512.

In step 510, the load energy is set to zero. In step 514, the tensioner travel signal is set to the predetermined signal (i.e., Normal). Control continues in step 512. In step 512, a control mode is set to an upper limit control mode (i.e., Upper). The control mode is initially set to the upper limit control mode.

In step 516, control determines whether the motor torque is greater than or equal to a torque upper maximum (i.e., $T_{um}$). The torque upper maximum may be determined from the calibration memory 104. Alternatively, the torque upper maximum may be determined based on the geometries of components of the accessory drive system 40. If true, then control continues in step 518. If false, control returns to step 502.

In step 518, the motor speed is determined. In step 520, the engine speed is determined. In step 522, the slip speed is determined based on the motor and the engine speeds.

In step 524, the slip percentage (i.e., PER) is determined based on the slip and the motor speeds. In step 526, the slip power is determined based on the motor torque and the slip speed. In step 528, the load energy is determined based on the slip power.

In step 530, control determines whether the load energy is greater than or equal to a energy upper minimum (i.e., $E_{um}$). The energy upper minimum may be determined from the calibration memory 104. Alternatively, the energy upper minimum may be determined based on the geometries of components of the accessory drive system 40. If true, control continues in step 532. If false, control returns to step 502.

In step 532, control determines whether the load energy is greater than or equal to the energy upper limit (i.e., $E_{ul}$). If false, control continues in step 534. If true, control continues in step 536.

In step 534, control determines whether the slip percentage is greater than or equal to the slip percentage upper limit (i.e., $PER_u$). If true, control continues in step 536. If false, control returns to step 502. In step 536, the tensioner travel signal is set to the upper limit signal. Control returns to step 502.

In step 508, control determines whether the motor torque is less than or equal to the torque lower limit (i.e., $T_{ll}$). If true, control continues in step 538. If false, control continues in step 540.

In step 538, control determines whether the load energy is greater than zero. If true, control continues in step 542. If false, control continues in step 544.

In step 542, the load energy is set to zero. In step 546, the tensioner travel signal is set to the predetermined signal. Control continues in step 544. In step 544, the control mode is set to a lower limit control mode (i.e., Lower).

In step 548, control determines whether the motor torque is less than or equal to a torque lower minimum (i.e., $T_{lm}$). The torque lower minimum may be determined from the calibration memory 104. Alternatively, the torque lower minimum may be determined based on the geometries of components of the accessory drive system 40. If true, control continues in step 550. If false, control returns to step 502.

In step 550, the motor speed is determined. In step 552, the engine speed is determined. In step 554, the slip speed is determined based on the motor and the engine speeds.

In step 556, the slip percentage is determined based on the slip and the motor speeds. In step 558, the slip power is determined based on the motor torque and the slip speed. In step 560, the load energy is determined based on the slip power.

In step 562, control determines whether the load energy is less than or equal to a energy lower maximum (i.e., $E_{lm}$). The energy lower maximum may be determined from the calibration memory 104. Alternatively, the energy lower maximum may be determined based on the geometries of components of the accessory drive system 40. If true, control continues in step 564. If false, control returns to step 502.

In step 564, control determines whether the load energy is less than or equal to the energy lower limit (i.e., $E_{ll}$). If false, control continues in step 566. If true, control continues in step 568.

In step 566, control determines whether the slip percentage is less than or equal to the slip percentage lower limit (i.e., $PER_l$). If true, control continues in step 568. If false, control returns to step 502. In step 568, the tensioner travel signal is set to the lower limit signal. Control returns to step 502.

In step 540, control determines whether the control mode is set to the upper limit control mode. If true, control continues in step 570. If false, control continues in step 572.

In step 570, an energy proportional index (i.e., INDEX) is determined based on the torque upper limit and the motor torque. When the control mode is set to the upper limit control mode, the energy proportional index INDEX may be determined according to the following equation:

$$INDEX = T_{ul} - T_{mot}, \quad (5)$$

where $T_{ul}$ is the torque upper limit. Control continues in step 574.

In step 572, the energy proportional index is determined based on the motor torque and the torque lower limit. When the control mode is set to the lower limit control mode, the energy proportional index may be determined according to the following equation:

$$INDEX = T_{mot} - T_{ll}, \quad (6)$$

where $T_{ll}$ is the torque lower limit. Control continues in step 574.

In step 574, an energy constant (i.e., $k_e$) is determined based on the energy proportional index, for example, from a look-up table and is between 0 and 1 in value. The energy constant $k_e$ may be determined according to the following relationship:

$$k_e = f(INDEX). \quad (7)$$

In step 576, the load energy is determined based on the energy constant. The load energy may be determined according to the following equation:

$$E(t) = E(t-dt) + k_e(0 - E)(t-dt)), \quad (8)$$

where t−dt is a time value associated with a previously determined load energy.

In step 578, control determines whether an absolute value of the load energy is less than or equal to an energy normal limit ($E_n$). The energy normal limit may be determined from the calibration memory 104. Alternatively, the energy normal limit may be determined based on the geometries of components of the accessory drive system 40. If true, control continues in step 580. If false, control returns to step 502. In step 580, the tensioner travel signal is set to the predetermined signal. Control returns to step 502.

Figure 7:
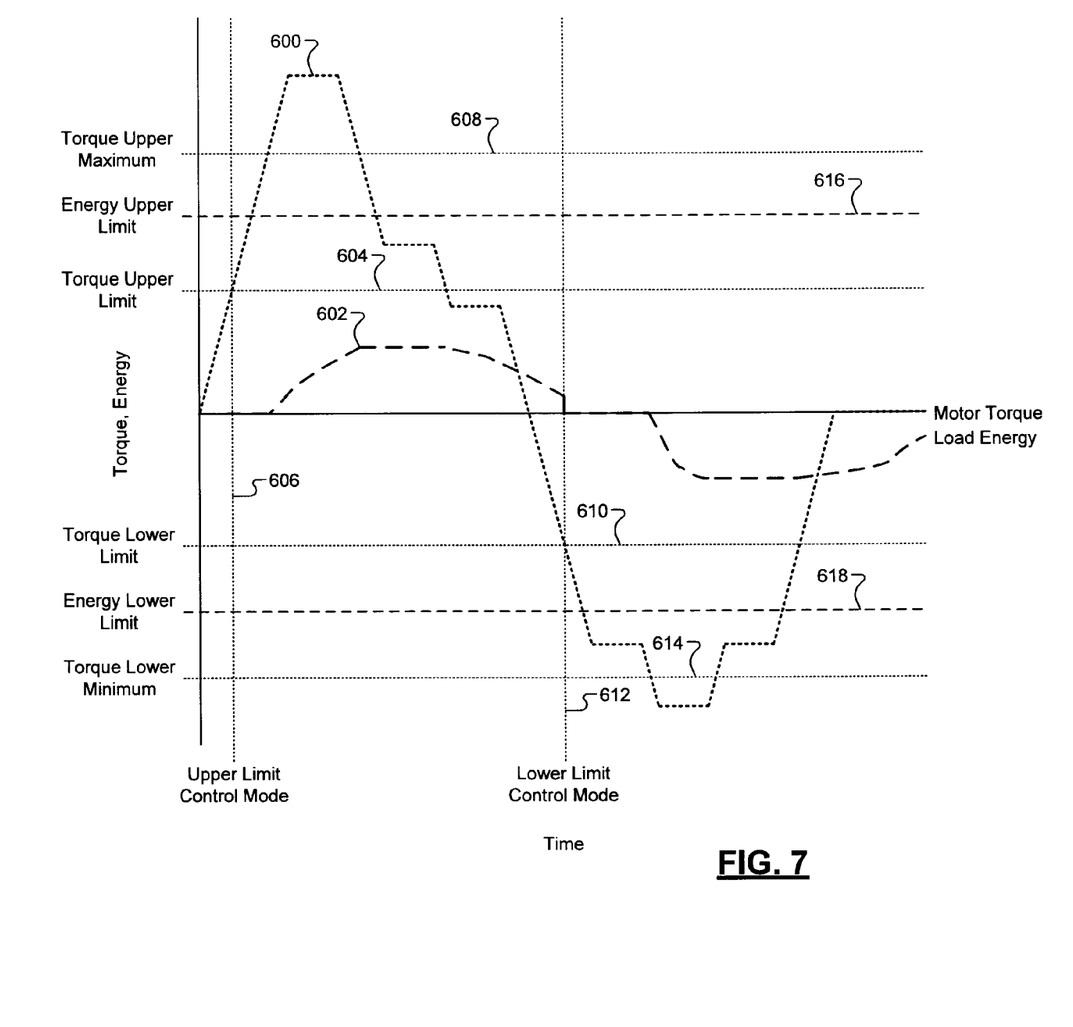
FIG. 7 is a graph depicting a motor torque versus a time for an electric drive motor of the vehicle and a load energy versus the time for the accessory drive system according to the principles of the present disclosure.

Referring now to FIG. 7, a graph depicts a motor torque 600 versus a time for the motor 36 and a load energy 602 versus the time for the accessory drive system 40. The motor torque 600 and the load energy 602 are initially set to zero. The motor torque 600 is increased to a torque upper limit 604, and the control mode is set to an upper limit control mode as indicated at 606.

The motor torque 600 is further increased to a torque upper maximum 608, and the load energy 602 accumulates over the time. The motor torque 600 is decreased to less than the torque upper maximum 608, and the load energy 602 stops accumulating over time. The motor torque 600 is further decreased to less than the torque upper limit 604, and the load energy 602 decreases based on the energy proportional constant.

The motor torque 600 is further decreased to a torque lower limit 610, and the control mode is set to a lower limit control mode as indicated at 612. In addition, the load energy 602 is set to zero due to the decrease in the motor torque 600. The motor torque 600 is further decreased to a torque lower minimum 614, and the load energy 602 accumulates over the time but is negative in value.

The motor torque 600 is increased to greater than the torque lower minimum 614, and the load energy 602 stops accumulating over time. The motor torque 600 is further increased to greater than the torque lower limit 610, and the load energy 602 increases based on the energy proportional constant. Throughout the time, the load energy 602 is not greater than or equal to a energy upper limit 616 and not less than or equal to a energy lower limit 618.

Figure 8:
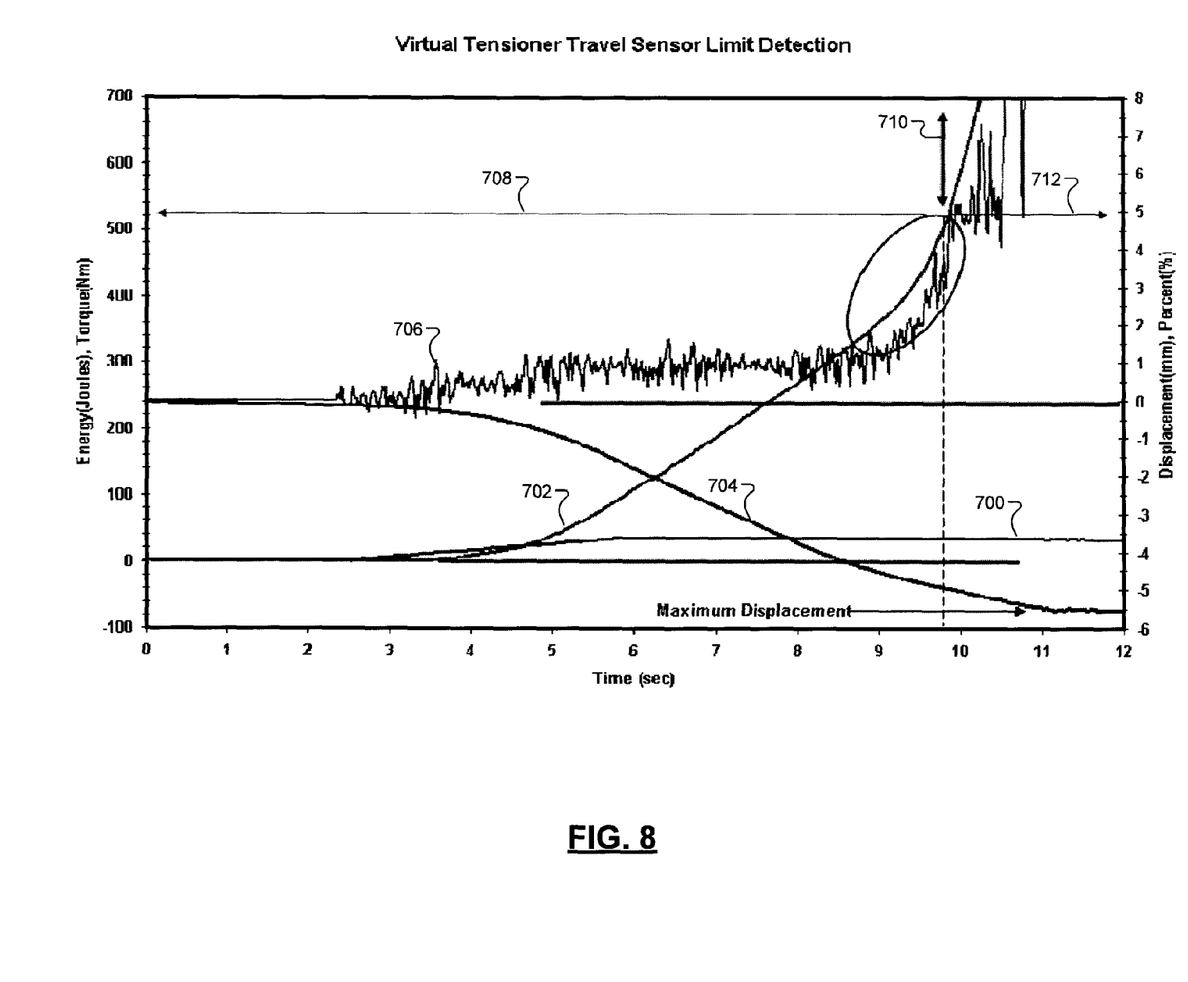
FIG. 8 is a graph depicting a motor torque versus a time for the motor and a load energy, a tensioner displacement and a slip percentage versus the time for the accessory drive system according to the principles of the present disclosure.

Referring now to FIG. 8, a graph depicts a motor torque 700 versus a time for the motor 36 and a load energy 702, a tensioner displacement 704, and a slip percentage 706 versus the time for the accessory drive system 40. The motor torque 700, the load energy 702, the tensioner displacement 704, and the slip percentage 706 are initially set to zero. When the motor torque 700 is increased to the torque upper maximum, the load energy 702 accumulates over the time. In addition, the tensioner displacement 704 (i.e., travel) decreases due to the increase in the motor torque 700. When the load energy 702 increases to a energy upper limit 708, the tensioner travel signal is set to an upper limit signal 710.

The slip percentage 706 increases based on the slip and the motor speeds. When the slip percentage 706 increases to a slip percentage upper limit 712, the tensioner travel signal is set to the upper limit signal 710. When the tensioner travel signal is set to the upper limit signal 710, the torque upper limit is applied to the requested motor torque, and a maximum displacement limit is applied to the tensioner displacement 704.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control module of a vehicle comprising:
    a drive diagnostic module that determines a load energy of an accessory drive system of the vehicle and that determines a slip percentage of a belt of the accessory drive system based on an engine speed and a motor speed; and
    a hybrid control module that determines a requested motor torque based on at least one of the load energy and the slip percentage,
    wherein the control module controls a motor of the vehicle based on the requested motor torque.

2. The control module of claim 1 wherein the drive diagnostic module further comprises a load energy module that determines the load energy based on a slip power of the belt.

3. The control module of claim 2 wherein the drive diagnostic module further comprises a slip power module that determines the slip power based on a motor torque and a slip speed of the belt.

4. The control module of claim 3 wherein the drive diagnostic module further comprises a slip speed module that determines the slip speed based on the engine speed and the motor speed.

5. The control module of claim 1 wherein the drive diagnostic module further comprises a slip percentage module that determines the slip percentage based on a slip speed of the belt and the motor speed.

6. The control module of claim 1 wherein the hybrid control module further comprises a torque limit module that applies a torque upper limit to the requested motor torque when a tensioner travel signal is an upper limit signal and that applies a torque lower limit to the requested motor torque when the tensioner travel signal is a lower limit signal.

7. The control module of claim 6 wherein the hybrid control module further comprises a tensioner travel module that sets the tensioner travel signal to the upper limit signal when the load energy is greater than or equal to an energy upper limit.

8. The control module of claim 7 wherein the tensioner travel module sets the tensioner travel signal to the upper limit signal when the load energy is less than the energy upper limit and the slip percentage is greater than or equal to a slip percentage upper limit.

9. The control module of claim 7 wherein the tensioner travel module sets the tensioner travel signal to the lower limit signal when the load energy is less than or equal to an energy lower limit.

10. The control module of claim 9 wherein the tensioner travel module sets the tensioner travel signal to the lower limit signal when the load energy is greater than the energy lower limit and the slip percentage is less than or equal to a slip percentage lower limit.

11. The control module of claim 7 wherein the tensioner travel module sets the tensioner travel signal to a predetermined signal.

12. A method of operating a control module of a vehicle comprising:
    determining a load energy of an accessory drive system of the vehicle;
    determining a slip percentage of a belt of the accessory drive system based on an engine speed and a motor speed;
    determining a requested motor torque based on at least one of the load energy and the slip percentage; and
    controlling a motor of the vehicle based on the requested motor torque.

13. The method of claim 12 further comprising determining the load energy based on a slip power of the belt.

14. The method of claim 13 further comprising determining the slip power based on a motor torque and a slip speed of the belt.

15. The method of claim 14 further comprising determining the slip speed based on the engine speed and the motor speed.

16. The method of claim 12 further comprising determining the slip percentage based on a slip speed of the belt and the motor speed.

17. The method of claim 12 further comprising:
    applying a torque upper limit to the requested motor torque when a tensioner travel signal is an upper limit signal; and
    applying a torque lower limit to the requested motor torque when the tensioner travel signal is a lower limit signal.

18. The method of claim 17 further comprising setting the tensioner travel signal to the upper limit signal when the load energy is greater than or equal to an energy upper limit.

19. The method of claim 18 further comprising setting the tensioner travel signal to the upper limit signal when the load energy is less than the energy upper limit and the slip percentage is greater than or equal to a slip percentage upper limit.

20. The method of claim 17 further comprising setting the tensioner travel signal to the lower limit signal when the load energy is less than or equal to an energy lower limit.

21. The method of claim 20 further comprising setting the tensioner travel signal to the lower limit signal when the load energy is greater than the energy lower limit and the slip percentage is less than or equal to a slip percentage lower limit.

22. The method of claim 17 further comprising setting the tensioner travel signal to a predetermined signal.

* * * * *